Sept. 18, 1934.  H. H. TIMIAN  1,973,889
ENGINE
Filed Jan. 26, 1931
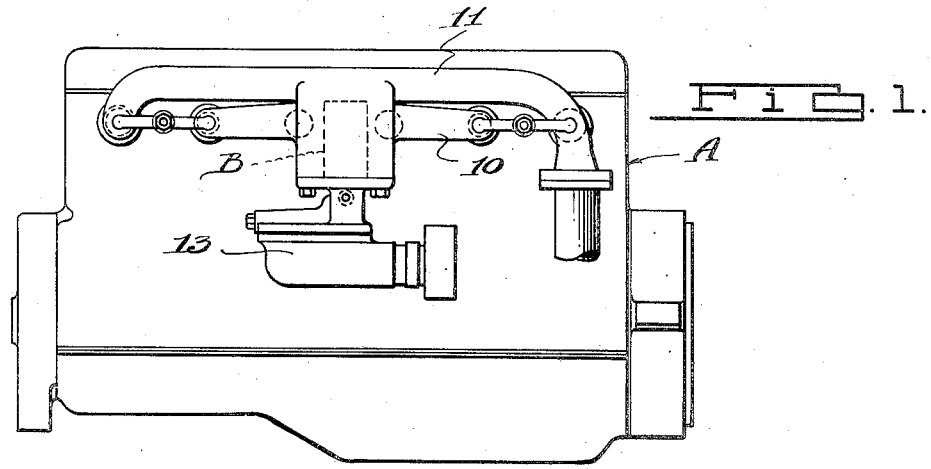
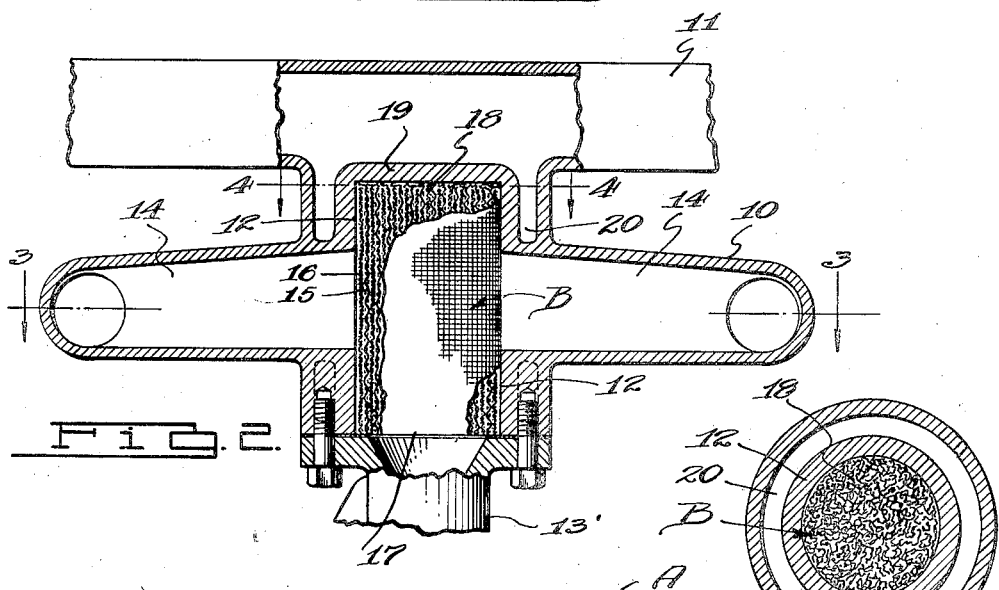
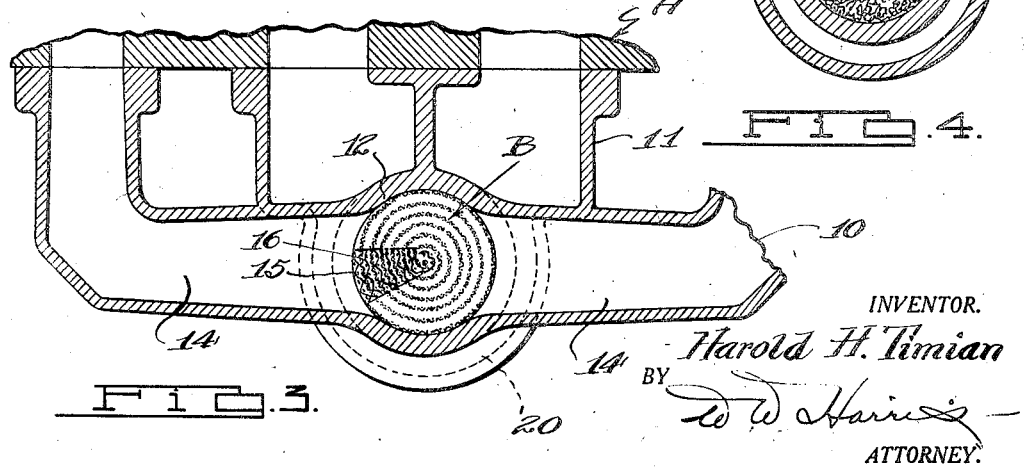
INVENTOR.
Harold H. Timian
BY
ATTORNEY.

Patented Sept. 18, 1934

1,973,889

UNITED STATES PATENT OFFICE 1,973,889

ENGINE

Harold H. Timian, Detroit, Mich., assignor to Continental Motors Corporation, Detroit, Mich., a corporation of Virginia Application January 26, 1931, Serial No. 511,172

6 Claims. (Cl. 123—141)

This invention relates to internal combustion engines and refers more particularly to the fuel mixture supply.

It is an object of the invention to provide means for improving the fuel mixture characteristics of internal combustion engines and also to improve the economy and general performance of such engines.

A further object of the invention is to provide improved means for preventing the backfire from the engine from passage through the fuel mixing means such as a carburetor.

In carrying out my invention in its more specific aspects, I have provided a porous device located in the engine manifold, preferably intermediate the carburetor and engine, this porous body being adapted to diffuse and atomize the fuel mixture supplied by the carburetor. At the same time the porous body is adapted to conduct heat from a convenient source of supply so that while the fuel mixture is being diffused it will be substantially uniformly heated whereby I am enabled to obtain a fuel mixture of a homogeneous nature.

Further objects and advantages of my invention will be apparent from the following description.

Referring to the accompanying drawing which illustrates one embodiment of my invention, Figure 1 is an elevation of an internal combustion engine illustrating my improvement attached thereto, Figure 2 is a sectional elevation view through the manifold riser and distributing branches, Figure 3 is a sectional detail view along the line 3—3 of Figure 2, and Figure 4 is a sectional view along the line of 4—4 of Figure 2.

In drawing reference character A represents an internal combustion engine which may be of customary construction, 10 representing the intake manifold and 11 the exhaust manifold. The intake manifold is formed with a riser 12 which opens to a fuel and air mixing device such as the usual carburetor 13. The riser 12 communicates with the laterally extending manifold branches 14 which are adapted to conduct the fuel mixture from the riser 12 to the usual intake valves (not shown) of the engine A.

Located preferably in the riser 12 and housed thereby, I have provided a porous fuel mixture treating device or body B which in the illustrated embodiment consists of a spirally cylindrically rolled body of copper mesh material 15 interposed between similarly rolled steel reinforcing mesh or gauze 16. The lower end 17 of the body B is preferably located adjacent the carburetor outlet 13' while the upper end 18 of this body is located in contact with the wall 19 of the riser 12, this wall 19 being exposed to the exhaust gases of manifold 11 whereby the heat of the exhaust gases may be transferred through wall 19 to the body B. In order to facilitate this heat transference, I preferably spread the loose ends of the material 15 and 16 over the end 18 of the body B to increase the area of contact for the body B and wall 19. Furthermore, in order to increase the amount of heat transferred to the body B, I contemplate in certain instances further subjecting the body B to the source of heat and to this end Figure 2 illustrates the heater jacketing or so called hot-spot 20 around the side walls of the riser 12 in addition to the heating wall 19.

The material 15 while being designated as a copper mesh may be of any suitable material preferably having a relatively high heat conductivity, and since I have selected copper as this material I deem it advisable to reinforce the copper mesh with the steel screen or gauze 16 in order to give the proper rigidity to the diffusing device B.

In operation of the device as thus far described the fuel globules discharged from the carburetor will pass through the copper mesh, thereby being highly diffused and atomized over the large number of small diameter wires composing the mesh structure B. The heat of the exhaust gases will be readily conducted through the body B whereby the center portions of the fuel mixture will be subjected to a heating action as well as the portions adjacent the walls of the heating jacket. In conventional hot spot constructions an objectionable stratification results by reason of a highly heated action on the gases adjacent the walls of the heating jacket while centrally located portions of the fuel mixture flow on relatively unheated; such action results in a non-uniform fuel mixture whereas with my improvement the fuel mixture and wet particles of varying sizes from the carburetor are thoroughly atomized and diffused with the application of a uniform heat, resulting in a very efficient fuel mixture.

In connection with the body B or as an independent improvement thereof, I have provided the manifold branches 14 with a decreasing cross section as these branches become more remote from the riser 12 in order to increase the velocity of the fuel mixture flow as the distance becomes greater from the hot spot. Thus a gradual increase of velocity serves to preserve the homogeneity of the fuel mixture charge prepared in the riser and to overcome the tendency toward precipitation and manifold loading.

It will further be noted that I have provided a very active device for preventing any back-fire which may occur from any of the engine cylinders from reaching the carburetor and usual fuel supply line which might result in fire. In the event of occurrence of a back-fire with my device, the flame will be effectively dissipated by the porous body B so as to prevent it from passing therebeyond.

In addition to a general improvement in the performance and economy over the whole power range of the engine as provided by my invention, I desire to particularly emphasize the beneficial results and fuel economy effected at low engine speeds. Heretofore the performance and economy of low speed engine performance has presented a number of difficulties in connecton with fuel distribution which my invention overcomes.

I desire to point out that the particular form of construction and other details of my invention especially in reference to the body B may be modified in detail and point of location in the fuel mixture distributing system. I have disclosed the location of the body B adjacent the carburetor 13 as this is a very effective location and obviously my improvements may be used in connection with down draft carburetors and various arrangements of manifolds and fuel distributing systems. I do not therefore, limit the scope of my invention except as may be specifically pointed out in the appended claims.

What I claim as my invention is:

1. In an engine having a carburetor and a manifold intermediate the carburetor and engine, a porous fuel mixture diffusing body within said manifold, said body receiving the fuel mixture from the carburetor axially of said body and discharging the diffused fuel mixture substantially at right angles thereto, and means applying heat to one end of said body for conduction therethrough.

2. In an internal combustion engine having a fuel mixture forming device, means for conducting said mixture to said engine, and a porous heat conducting device within said conducting means and interposed in said fuel mixture flow, said device comprising a copper mesh reinforced by a steel mesh rolled intermediate the rolls of copper mesh.

3. In an engine having a fuel mixture forming device, means for conducting the fuel mixture from said device to said engine, a fuel mixture diffusing means consisting of a closely wound roll of heat conducting fabricated material extending substantially longitudinally within the fuel mixture conducting portion, and means for applying heat to one end of said roll for substantially uniformly heating the fuel mixture.

4. In an engine having a fuel mixture forming device, means for conducting the fuel mixture from said device to said engine, a fuel mixture diffusing means consisting of a closely wound roll of heat conducting fabricated material extending substantially longitudinally within the fuel mixture conducting portion, and means including a heating jacket located adjacent one end of said conducting portion for applying heat to one end of said roll for substantially uniformly heating the fuel mixture.

5. In an engine having a fuel mixture forming device, means for conducting the fuel mixture from said device to said engine, a fuel mixture diffusing means consisting of a closely wound roll of heat conducting fabricated material extending substantially longitudinally within the fuel mixture conducting portion, and means for applying heat to one end of said roll for substantially uniformly heating the fuel mixture, said fuel mixture conducting portion having lateral runner portions communicating with an intermediate portion of said conducting portion.

6. In an engine having a fuel mixture forming device, means for conducting the fuel mixture from said device to said engine, a fuel mixture diffusing means consisting of a closely wound roll of heat conducting fabricated material extending substantially longitudinally within the fuel mixture conducting portion, and means including a heating jacket substantially enclosing one end of said conducting portion whereby to apply heat to one end of said roll for substantially uniformly heating the fuel mixture.

HAROLD H. TIMIAN.